US010190906B2

(12) United States Patent
Kuo et al.

(10) Patent No.: US 10,190,906 B2
(45) Date of Patent: Jan. 29, 2019

(54) LIGHT SENSOR SENSING ILLUMINATION OF A PARTIAL AREA

(71) Applicant: Chicony Power Technology Co., Ltd., New Taipei (TW)

(72) Inventors: Chieh-Hsin Kuo, New Taipei (TW); Hung-Jui Chang, New Taipei (TW); Ting-Fu Hsu, New Taipei (TW); Wei-Che Lee, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 154 days.

(21) Appl. No.: 15/367,500

(22) Filed: Dec. 2, 2016

(65) Prior Publication Data
US 2017/0191869 A1 Jul. 6, 2017

Related U.S. Application Data

(60) Provisional application No. 62/273,537, filed on Dec. 31, 2015.

(51) Int. Cl.
| | |
|---|---|
| *G01J 1/04* | (2006.01) |
| *G01J 1/42* | (2006.01) |
| *G01J 1/02* | (2006.01) |
| *H05B 37/02* | (2006.01) |

(52) U.S. Cl.
CPC ........... *G01J 1/0266* (2013.01); *G01J 1/0271* (2013.01); *G01J 1/0437* (2013.01); *G01J 1/4228* (2013.01); *H05B 37/0227* (2013.01); *H05B 37/0272* (2013.01)

(58) Field of Classification Search
CPC .......... G01J 1/06; G01J 1/0271; G01J 1/0214; G01J 1/0418; G01J 1/4214; G01J 5/06; G01J 2001/061
See application file for complete search history.

(56) References Cited

U.S. PATENT DOCUMENTS

| | | | | |
|---|---|---|---|---|
| 6,163,377 A | * | 12/2000 | Boles ........................ | G01J 1/06 250/226 |
| 8,664,603 B2 | | 3/2014 | Yamashina et al. | |
| 9,329,087 B2 | | 5/2016 | Saito | |
| 2008/0291968 A1 | * | 11/2008 | Ernst ........................ | G01J 5/02 374/131 |
| 2013/0271438 A1 | | 10/2013 | Aflatooni | |

FOREIGN PATENT DOCUMENTS

| | | |
|---|---|---|
| CN | 201311323 Y | 9/2009 |
| JP | 2010219244 A | 9/2010 |
| TW | 200809149 A | 2/2008 |
| TW | M456664 U | 7/2013 |

* cited by examiner

*Primary Examiner* — Thanh Luu
(74) *Attorney, Agent, or Firm* — Alan D. Kamrath; Kamrath IP Lawfirm, P.A.

(57) ABSTRACT

A light sensor, for sensing an illumination of a partial area, includes a first case, a second case, a first light absorption layer and at least one sensing module. The first case includes at least one hole. The at least one hole includes an axis. The second case is fastened to the first case, and a containing space is formed between the first case and the second case. The first light absorption layer is located on the first case. The at least one sensing module is located in the containing space, and the position of the at least one sensing module is located on the axis of the hole. The at least one sensing module is used for sensing the light from the partial area which passes through the hole to obtain the illumination of the partial area.

13 Claims, 6 Drawing Sheets

LIGHT SENSOR SENSING ILLUMINATION OF A PARTIAL AREA

BACKGROUND OF THE INVENTION

1. Field of the Invention

The present invention relates to a light sensor. More particularly, the present invention relates to a light sensor for sensing an illumination of a partial area.

2. Description of the Related Art

The light sensor is a very important sensor among the numerous environmental sensors. The light sensor is often applied in controlling systems related to the Internet of Things, such as an environmental monitoring system, a smart home or a smart building, to sense the light illumination of the surrounding environment and to combine the illumination with a communication function, the Internet of Things, and the computation of data in the cloud, to provide a more convenient service in daily life.

The light sensor of the prior art is used for sensing the illumination of the whole surrounding area. However, for the smart building system, there is a need to sense the illumination of a specific area (for example, the light controlling system of a meeting room of an office usually needs to detect only the illumination of the area of the meeting table). Therefore, there is a need to provide a new light sensor to sense the illumination of a specific partial area.

SUMMARY OF THE INVENTION

It is an object of the present invention to provide a light sensor for sensing an illumination of a partial area.

To achieve the abovementioned object, the light sensor of the present invention is used for sensing an illumination of a partial area. The light sensor includes a first case, a second case, a first light absorption layer and at least one sensing module. The first case includes at least one hole. The at least one hole includes an axis. The second case is fastened to the first case, and a containing space is formed between the first case and the second case. The first light absorption layer is located on the first case. The at least one sensing module is located in the containing space, and the position of the at least one sensing module is located on the axis of the hole. The at least one sensing module is used for sensing the light from the partial area which passes through the hole to obtain the illumination of the partial area.

According to the first embodiment of the present invention, the first light absorption layer is located in the containing space.

According to the first embodiment of the present invention, the light sensor further includes a second light absorption layer, and the second light absorption layer is located on the second case.

According to the first embodiment of the present invention, the light sensor further includes a substrate, and the at least one sensing module is located on the substrate.

According to the first embodiment of the present invention, the second case further includes at least one fastening unit and at least one fastening part. The at least one fastening unit is fastened to the substrate via the at least one fastening part.

According to the first embodiment of the present invention, the second case further includes at least one external fastening unit and an outer surface, and the at least one external fastening unit is located on the outer surface.

According to the first embodiment of the present invention, a range of a hole diameter of the hole is between 3 and 6 millimeters.

According to the first embodiment of the present invention, the at least one hole is a vertical hole or an oblique hole.

According to the first embodiment of the present invention, the at least one hole is a vertical hole, and a range of a distance between the at least one sensing module and the hole is between 6 and 8 millimeters.

According to the first embodiment of the present invention, the partial area is a cone-shaped area, the range of the diameter of the bottom round surface of the cone-shaped area is between 80 and 120 centimeters, and the range of the height of the cone-shaped area is between 130 and 170 centimeters.

According to the second embodiment of the present invention, an amount of the at least one hole and the at least one sensing module are both two, with one hole being a vertical hole, and with the other one hole being an oblique hole.

According to the second embodiment of the present invention, the light sensor further includes a covering unit, and the covering unit is used for covering any one of the holes.

According to one embodiment of the present invention, the first case further includes a side face, and the side face tapers and extends from the first case to the hole.

According to one embodiment of the present invention, the at least one sensing module is a passive environmental detection module.

DETAILED DESCRIPTION OF THE PREFERRED EMBODIMENTS

The advantages and innovative features of the invention will become more apparent from the following detailed description when taken in conjunction with the accompanying drawings.

Figure 1:
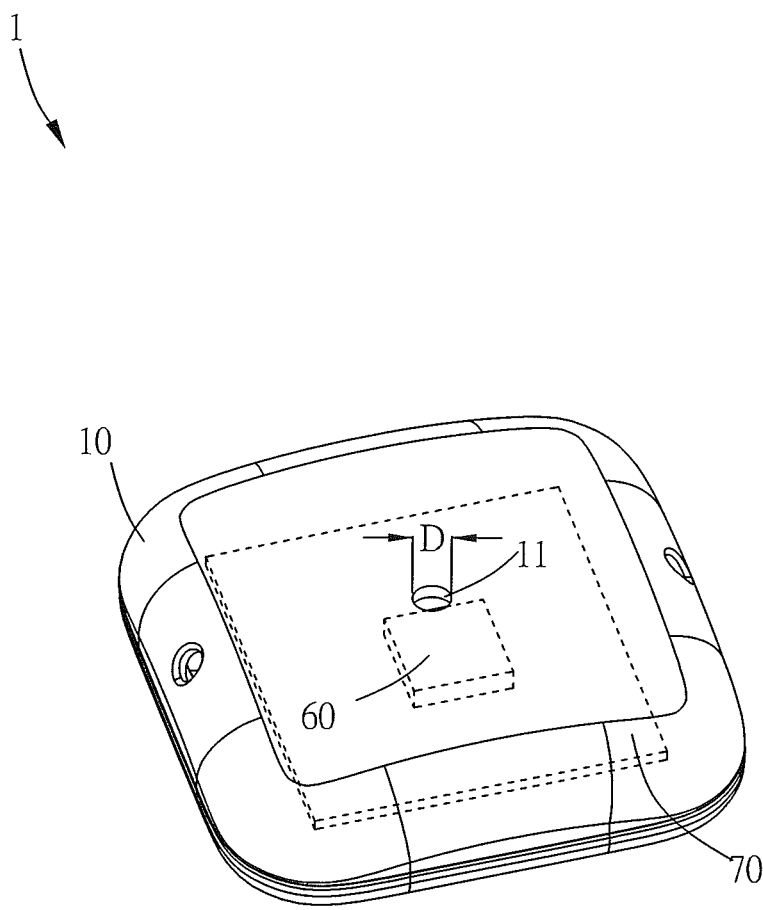
FIG. 1 illustrates a schematic drawing of the first embodiment of the light sensor of the present invention.
Figure 2:
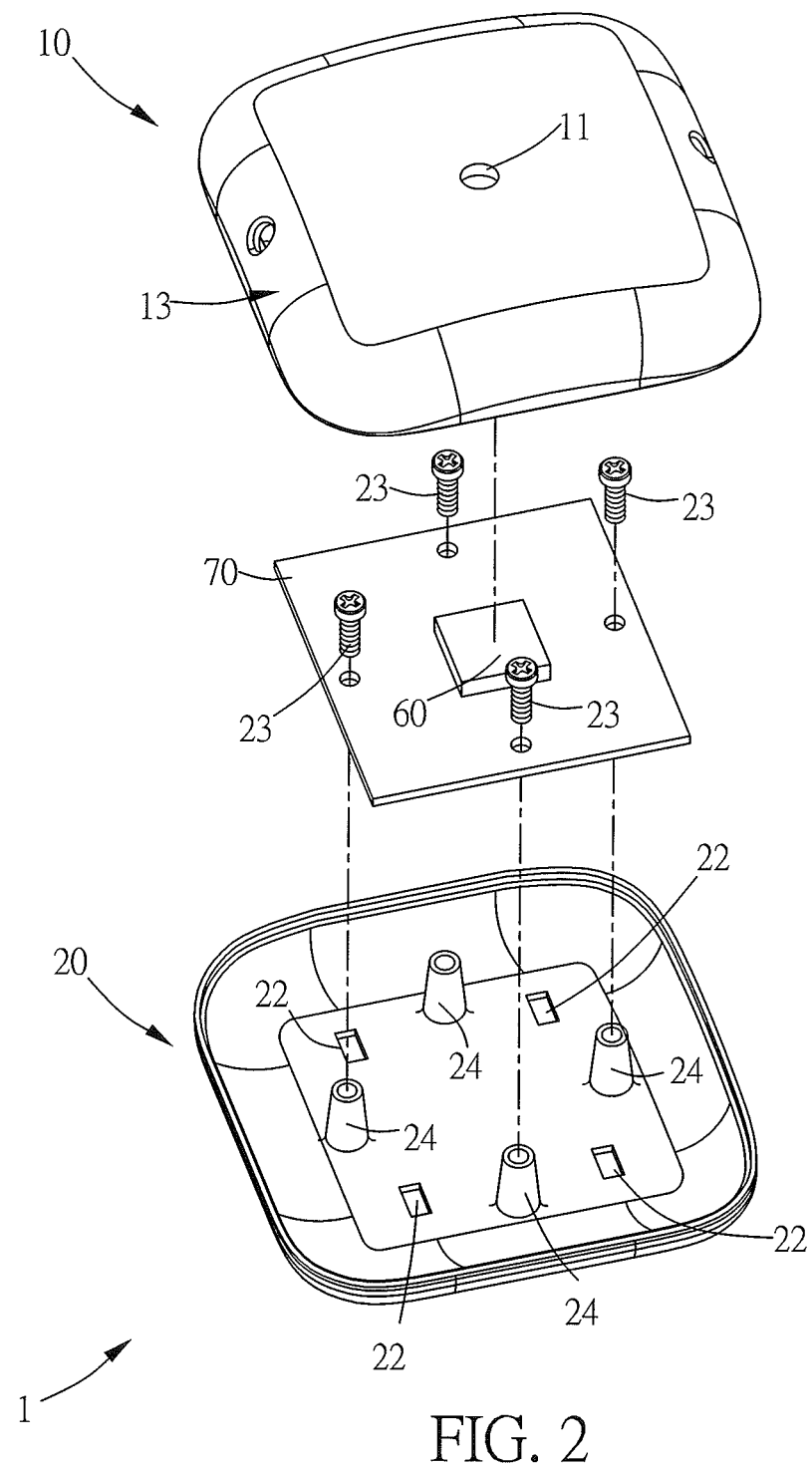
FIG. 2 illustrates an exploded view of the first embodiment of the light sensor of the present invention.
Figure 3:
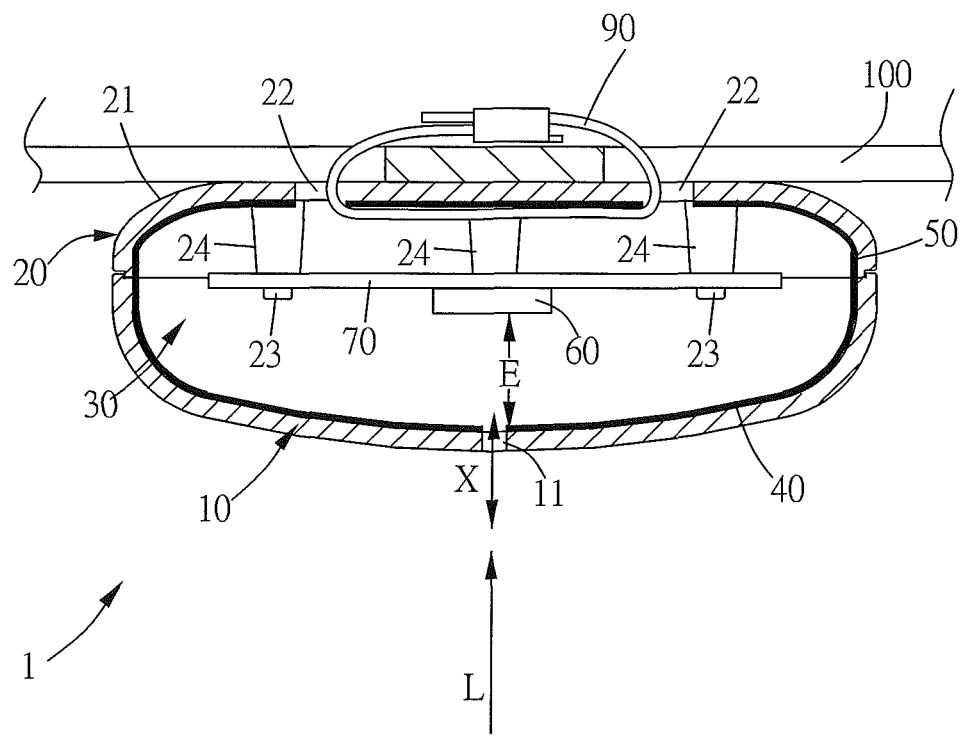
FIG. 3 illustrates a sectional view of the first embodiment of the light sensor of the present invention installed on a ceiling.
Figure 4:
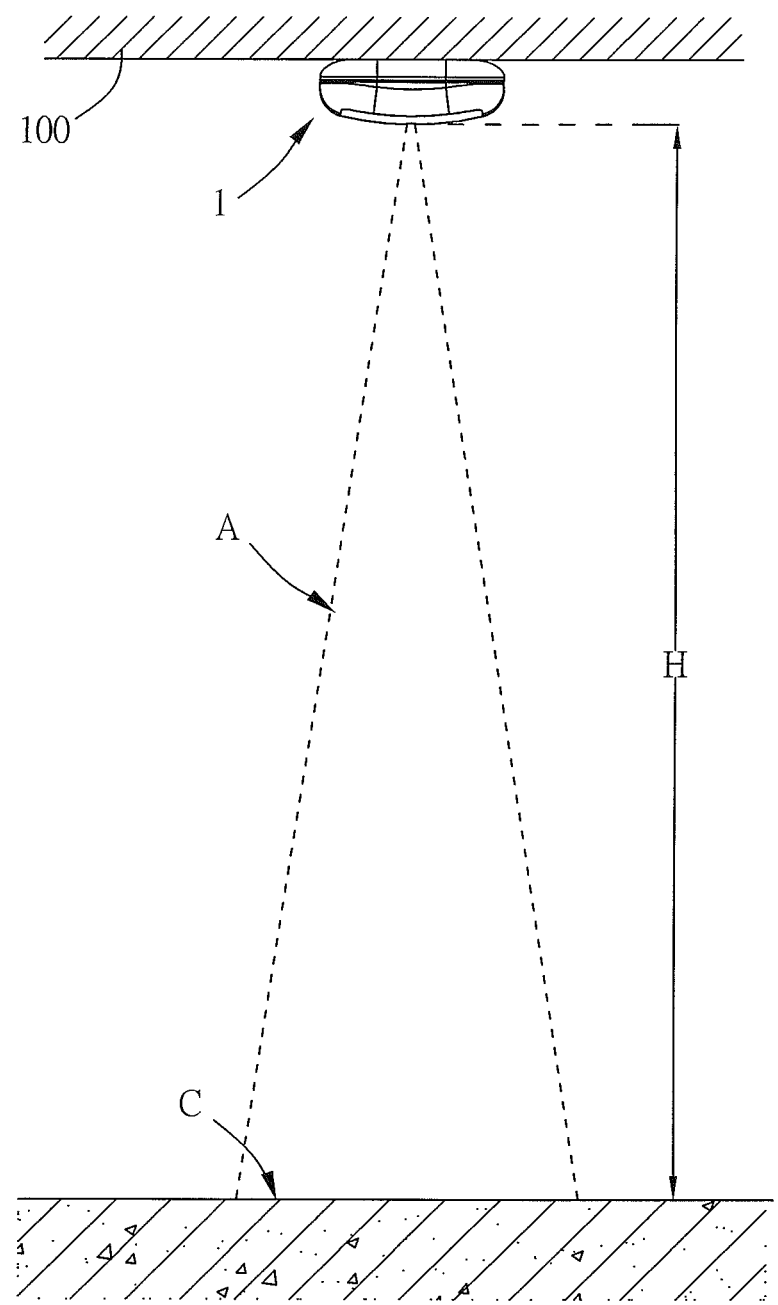
FIG. 4 illustrates a schematic drawing of using the first embodiment of the light sensor of the present invention.

Please refer to FIG. 1 to FIG. 4. FIG. 1 illustrates a schematic drawing of the first embodiment of the light sensor of the present invention. FIG. 2 illustrates an exploded view of the first embodiment of the light sensor of the present invention. FIG. 3 illustrates a sectional view of the first embodiment of the light sensor of the present invention installed on a ceiling. FIG. 4 illustrates a schematic drawing of using the first embodiment of the light sensor of the present invention.

As shown in FIG. 1 to FIG. 4, in the first embodiment of the present invention, the light sensor 1 is used for sensing an illumination in a partial area A. The partial area A can be a cone-shaped area. The range of the diameter of a bottom round surface C of the cone-shaped area is between 80 and 120 centimeters. According to an actual experiment, a preferred diameter is about 100 centimeters. The range of the height H of the cone-shaped area is between 130 and 170 centimeters. According to an actual experiment, a preferred height H is about 150 centimeters. The light sensor 1 includes a first case 10, a second case 20, a first light absorption layer 40, a second light absorption layer 50, a sensing module 60 and a substrate 70.

As shown in FIG. 2, in the first embodiment of the present invention, the first case 10 includes a hole 11 and a side face 13 in the shape of a square with rounded corners. The hole 11 is a vertical hole, and the hole 11 has an axis X. However, the type of the hole 11 is not limited to a vertical hole, and it can also be an oblique hole. The diameter D of the hole 11 is 5 millimeters. However, the size of the diameter D of the hole 11 is not limited to that design, and the size of the diameter D can be changed to any number between 3 and 6 millimeters. The square-ring-shaped side face 13 tapers and extends from the first case 10 to the hole 11, which means that the size of the horizontal sectional area of the first case 10 gradually decreases along the direction towards the hole 11. Therefore, the appearance of the first case 10 is compact and smooth with a quadrilateral and arced shape.

As shown in FIG. 2 to FIG. 4, in the first embodiment of the present invention, the second case 20 is fastened to the first case 10, and a containing space 30 is formed between the first case 10 and the second case 20. The second case 20 includes an outer surface 21, four external fastening units 22, four fastening units 23 and four fastening parts 24. The outer surface 21 is the exposed surface of the second case 20. The four external fastening units 22 are both through holes located on the outer surface 21. The external fastening units 22 are used for fastening to an external object. For example, the user can pass an external fastening belt 90 through the through hole of the external fastening unit 22 and fasten the external fastening belt 90 to the steel frame or to the light housing on the ceiling 100, such that the light sensor 1 can be fastened on the ceiling 100. However, the amount and the type of the external fastening unit 22 and the external object fastening method of the external fastening unit 22 are not limited to that abovementioned design, and they can be changed according to design requirements. The four fastening units 23 are screws, and the four fastening parts 24 are screw holes. The four fastening units 23 are respectively used for fastening to the substrate 70 via the four fastening parts 24, such that the substrate 70 can be combined with the second case 20. However, the amount of the fastening units 23 and the fastening parts 24 are not limited to four, and the amount can be changed according to design requirements.

As shown in FIG. 3, in the first embodiment of the present invention, the first light absorption layer 40 is a black paint layer located on the inner side of the first case 10 and in the containing space 30. The first light absorption layer 40 is used for absorbing the light which passes through the first case 10 to ensure that light can enter the light sensor 1 only via the hole 11.

In the first embodiment of the present invention, the second light absorption layer 50 is a black paint layer. The second light absorption layer 50 is located on the inner side of the second case 20 and in the containing space 30. The second light absorption layer 50 is used for absorbing the light which passes through the second case 20 to ensure that light can enter the light sensor 1 only via the hole 11.

As shown in FIG. 2 to FIG. 4, in the first embodiment of the present invention, the sensing module 60 is a passive environmental detection module. The sensing module 60 is located above the substrate 70 and in the containing space 30. The position of the sensing module 60 is on the axis X of the hole 11. The sensing module 60 is used for sensing the light L from the partial area A which passes through the hole 11 for sensing the illumination of the partial area A. According to an actual experiment, if the distance E between the sensing module 60 and the hole 11 is 7 millimeters, the light sensing effect of the sensing module 60 will be the optimum light sensing effect. However, the amount of the distance E is not limited to that design, and the distance E can be changed to any number between 6 and 8 millimeters. The substrate 70 is a circuit board which is electrically connected to the sensing module 60 and to an external network system (such as an environmental monitoring system or a smart residential system). The substrate 70 is used for sending the illumination which is sensed by the sensing module 60 to the external network system so that the external network system, can monitor the changing of the illumination and adjust the ambient brightness of the region where the partial area A is according to the changing of the illumination.

When the user wants to use the light sensor 1 of the present invention to sense the illumination of the partial area A, as shown in FIG. 2 to FIG. 4, the user can pass an external fastening belt 90 through the through holes of the four external fastening units 22 and fasten the external fastening belt 90 to the steel frame or to the light housing on the ceiling 100, such that the light sensor 1 can be fastened to the ceiling 100. Then, the light L from the partial area A under the light sensor 1 can pass through the hole 11 substantially along the axis X to enter the containing space 30 and contact the sensing module 60, such that the sensing module 60 can sense the light L from the partial area A which passes through the hole 11 and thereby sense the illumination of the partial area A. However, light from outside of the partial area A cannot pass through the hole 11 along the axis X, because the light path is too indirect to meet the axis X. Therefore, the sensing module 60 cannot sense light from outside of the partial area A. Furthermore, because the first light absorption layer 40 and the second light absorption layer 50 are respectively located on the inner side of the first case 10 and the inner side of the second case 20, the two light absorption layers can absorb the light which passes through the first case 10 and the second case 20 to further ensure that only the light from the partial area A can pass through the hole 11 to enter the light sensor 1. After the light sensor 1 senses the illumination of the partial area A, the sensing module 60 will send the illumination information to the substrate 70, and the substrate 70 will send the illumination information to the external network system, so that the external network system can monitor the changing of the illumination and adjust the ambient brightness of the region where the partial area A is according to the changing of the illumination.

Figure 5:
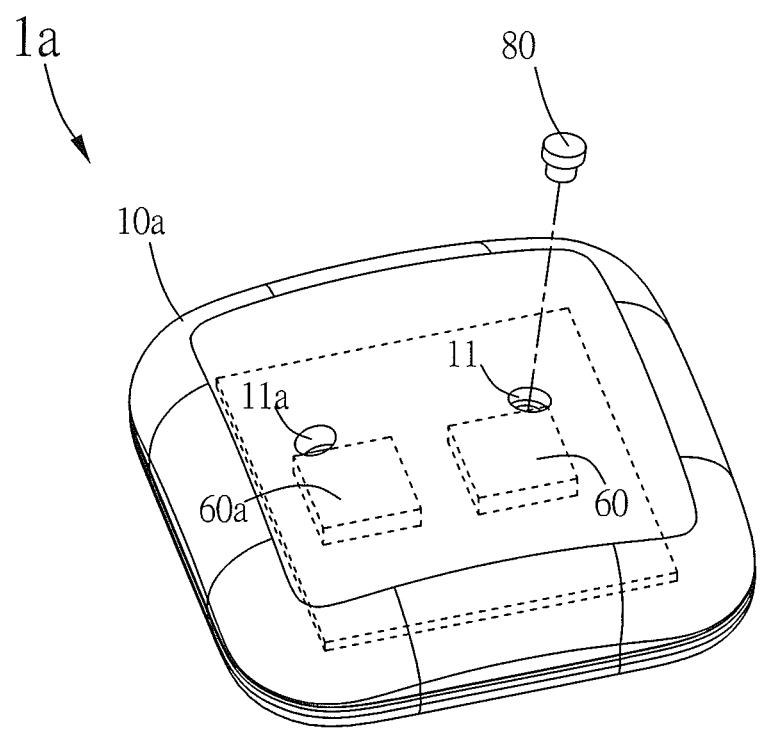
FIG. 5 illustrates a schematic drawing of the second embodiment of the light sensor of the present invention.
Figure 6:
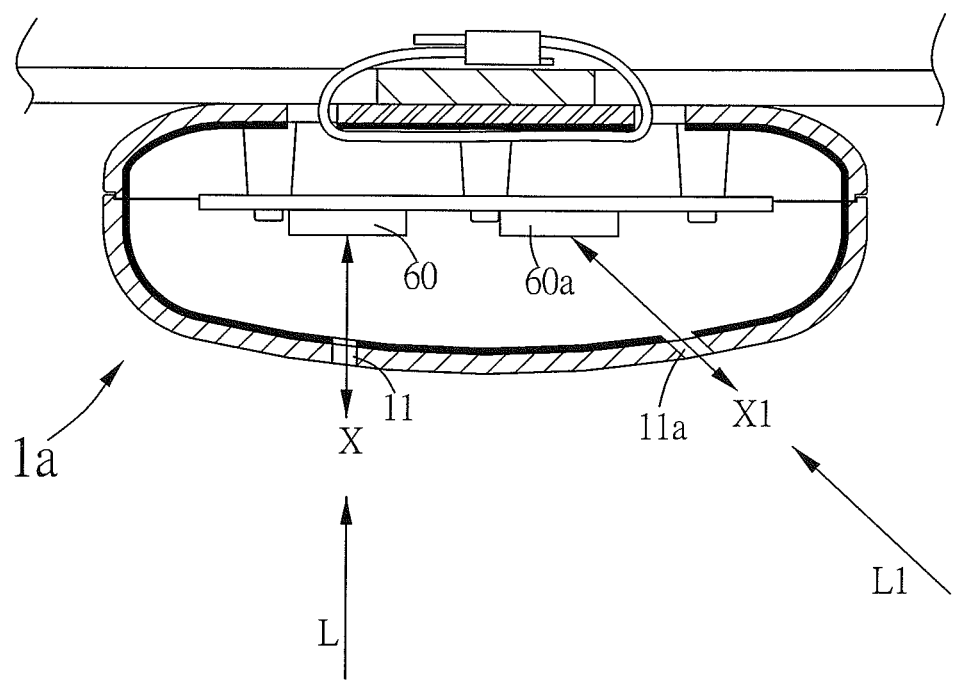
FIG. 6 illustrates an exploded view of the second embodiment of the light sensor of the present invention installed on the ceiling.

Please refer to FIG. 5 to FIG. 6. FIG. 5 illustrates a schematic drawing of the second embodiment of the light sensor of the present invention. FIG. 6 illustrates an exploded view of the second embodiment of the light sensor of the present invention installed on a ceiling.

As shown in FIG. 5 and FIG. 6, the difference between the first embodiment and the second embodiment is that, in the second embodiment, the amounts of the holes 11, 11*a* in the first case 10*a* and the sensing modules 60, 60*a* are both two. The hole 11 is a vertical hole which has an axis X, and another hole 11*a* is an oblique hole which has another axis X1. The sensing module 60 is used for receiving the light L which passes through the vertical hole of the hole 11, and the sensing module 60a is used for receiving the light L1 which passes through the oblique hole of the hole 11a. Because the hole 11a is an oblique hole, and because the axis X1 is also oblique, only the oblique light from another partial area which is substantially aligned with the axis X1 can pass through the hole 11a to contact the sensing module 60a. By this design, the light sensor 1a of the second embodiment can be used for sensing the illumination of the partial area A which is directly below the light sensor 1a, such that the light sensor 1a can also be used for sensing the illumination of a second partial area. Furthermore, the light sensor 1a of the second embodiment further includes a covering unit 80. The covering unit 80 can be a soft rubber plug for covering any one of the holes 11, 11a. If the user does not want the light sensor 1a to sense simultaneously the illumination of the partial area directly below the light sensor 1a and the illumination of the second partial area, and if the user only wants the light sensor 1a to sense the illumination of one of the partial areas, the user can use the covering unit 80 to cover the hole which is not required, such that only the required hole is open for being passed through by the light from the partial area.

Via the structure of the light sensors 1, 1a of the present invention, the light sensors 1, 1a will not sense the light from the entire surrounding area, and the light sensors 1, 1a can sense the illumination of a specific partial area. The illumination of the specific partial area can be sent to the external network system, such that the external network system can monitor the changing of the illumination and adjust the ambient brightness of the region where the partial area is according to the changing of the illumination.

It is noted that the above-mentioned embodiments are only for illustration. It is intended that the present invention cover modifications and variations provided they fall within the scope of the following claims and their equivalents. Therefore, it will be apparent to those skilled in the art that various modifications and variations can be made to the structure of the present invention without departing from the scope or spirit of the invention.

What is claimed is:

1. A light sensor for sensing an illumination of a partial area, with the light sensor comprising:
   a first case comprising two holes, wherein one of the two holes is a vertical hole, another of the two holes is an oblique hole, and each of the two holes comprises an axis;
   a second case fastened to the first case, wherein a containing space is formed between the first case and the second case;
   a first light absorption layer located on the first case; and
   two sensing modules located in the containing space; wherein positions of the two sensing modules are on the axes of the two holes, wherein the two sensing modules are respectively used for sensing a light from the partial area which passes through the vertical hole and the oblique hole to sense the illumination of the partial area.

2. The light sensor as claimed in claim 1, wherein the first light absorption layer is located in the containing space.

3. The light sensor as claimed in claim 2, further comprising a second light absorption layer, wherein the second light absorption layer is located on the second case.

4. The light sensor as claimed in claim 3, further comprising a substrate, wherein the two sensing modules are located on the substrate.

5. The light sensor as claimed in claim 4, wherein the second case further comprises at least one fastening unit and at least one fastening part, wherein the at least one fastening unit is fastened to the substrate via the at least one fastening part.

6. The light sensor as claimed in claim 5, wherein the second case further comprises at least one external fastening unit and an outer surface, wherein the at least one external fastening unit is located on the outer surface.

7. The light sensor as claimed in claim 6, wherein a range of a hole diameter of each of the two holes is between 3 and 6 millimeters.

8. The light sensor as claimed in claim 7, wherein and a range of a distance between the two sensing modules and the two holes is between 6 and 8 millimeters.

9. The light sensor as claimed in claim 8, wherein the partial area is a cone-shaped area, a range of a diameter of a bottom round surface of the cone-shaped area is between 80 and 120 centimeters, and a range of a height of the cone-shaped area is between 130 and 170 centimeters.

10. The light sensor as claimed in claim 9, wherein the first case further comprises a side face, and wherein the side face tapers and extends from the first case to the vertical hole.

11. The light sensor as claimed in claim 10, wherein each of the two sensing modules is a passive environmental detection module.

12. The light sensor as claimed in claim 1, further comprising a covering unit, wherein the covering unit is used for covering any one of the two holes.

13. The light sensor as claimed in claim 12, wherein the first case further comprises a side face, and wherein the side face tapers and stretches from the first case to the vertical hole.

* * * * *